June 12, 1928. 1,673,149
I. KOHN ET AL
PORTABLE COOLING AND HEATING DEVICE FOR VEHICLES
Filed July 20, 1927

INVENTOR
Ignatius Kohn
Frank Saghy
BY
ATTORNEY

Patented June 12, 1928.

1,673,149

UNITED STATES PATENT OFFICE.

IGNATIUS KOHN AND FRANK SAGHY, OF NEW YORK, N. Y.

PORTABLE COOLING AND HEATING DEVICE FOR VEHICLES.

Application filed July 20, 1927. Serial No. 207,057.

This invention pertains to a portable heating and cooling device for motor vehicles and has for its object the provision of selectively producing a draft of cool or heated air.

Other objects and advantages of our invention will appear hereinafter the novel features and combinations being more clearly set forth in the appended claims.

Figure 1:
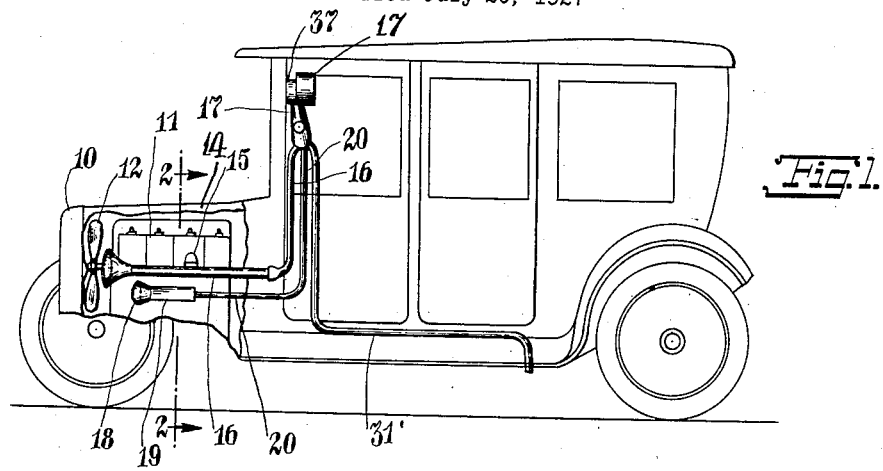
Fig. 1 is a perspective view of an automobile equipped with our invention.
Figure 2:
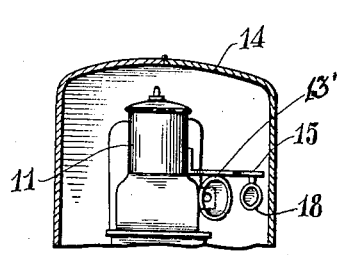
Fig. 2 is a sectional view taken on the line 2—2 of Fig. 1.

Referring particularly to Figs. 1 and 2 of the drawings, the numeral 10 designates an automobile of usual construction having a cylinder block 11 and a fan 12. A funnel shaped member 13' is disposed below the hood 14 of the automobile and is mounted in spaced relation to the cylinder block 11 on a bracket 15. The enlarged open end of the funnel 13' is disposed directly in back of the fan 12 and is adapted to receive a forced draft of air therefrom. A tubular member 16 is communicatively connected with the funnel 13' and is disposed longitudinally of the automobile to the rear compartment thereof as illustrated in Fig. 1. The funnel 13' and the tubular member 16 are adapted to receive a forced draft of cool air from the fan 12 and to carry the same to a discharge device 17, hereinafter more completely defined. It should be understood that the funnel 13' and the tube 16 attached thereto receive cool air from the fan 12 and also receive cool air which is forced into the funnel as the automobile moves forwardly and that if desired a cooling coil may be placed in the funnel 13' to further reduce the temperature of the incoming air.

Figure 5:
Fig. 5 is a perspective view of an air receiver embodied in our invention.
Figure 7:
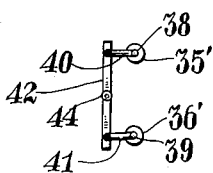
Fig. 7 is a top plan view of the valve actuating mechanism of our invention.

A funnel member 18 comprising a rectangular extension 19, more clearly shown in Fig. 5 is also mounted on the bracket 15 adjacent the cylinder block 11. The rectangular portion of the funnel member 18 is disposed adjacent the side of the cylinder block 11 in contact therewith and is adapted to heat the incoming air. A heating element may be mounted in the funnel 18 such as the ordinary electric heating element. The receiving end of the funnel 18 is located in back of the fan 12, a sufficient distance to miss the cool air draft created thereby and to receive the air current after it has become partially heated by contact with the cylinder block of the engine. A tubular member 20 is communicatively connected with the rectangular end 19 of the funnel 18 and is disposed longitudinally of the automobile to the rear compartment thereof and is also communicatively connected with the discharge device 17.

Figure 3:
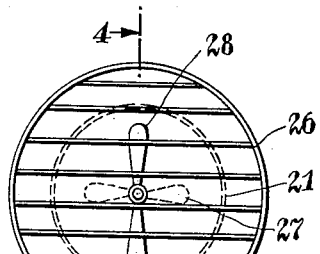
Fig. 3 is a front plan view of a portable fan mechanism; embodied in our invention.
Figure 4:
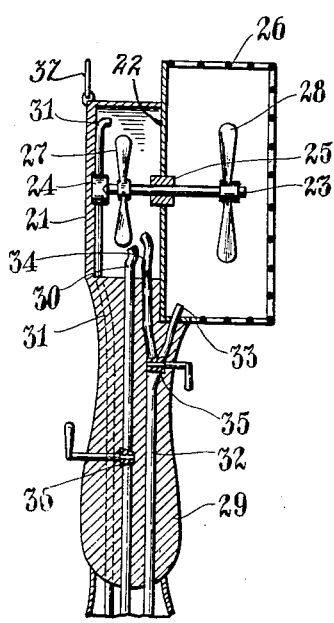
Fig. 4 is a longitudinal sectional view taken on the line 4—4 of Fig. 3.

As illustrated in Figs. 3 and 4, the discharge device 17 comprises a rear casing 21 having an extended front closure 22 which is provided with a central aperture. A shaft 23 is journaled at one extremity in a bearing 24 mounted on the rear end of the casing 21 and is journaled intermediate its ends in a bearing 25 mounted in the aperture of the front end 22 of the casing. A front casing 26 preferably comprising wire net work is mounted on the extended front end 22 of the rear casing 21. A propeller 27 is disposed within the rear casing 21 and is rigidly mounted on the shaft 23 and a fan member 28 is rigidly attached to the other end portion of the shaft 23 disposed in the front casing or guard 26.

A handle member 29 is attached to the bottom of the front and rear casings and is provided with a longitudinally extending tubular member 30 communicatively attached to the cool air tubular member 16. The upper end of the cool air tubular member 30 is bent or disposed in the direction of the propeller 27 and is adapted to discharge a blast of air thereagainst for rotating the propeller, the shaft 23 and the fan 28 mounted on said shaft. An outlet tube 31 is disposed adjacent the rear end of the casing 21 and extends downwardly through a passage in the handle 29. A rubber or flexible tube 31' is communicatively connected to the outlet tube 31 and is disposed at its lower end portion through an aperture in the floor of the automobile.

The outlet tube is adapted to discharge the air after it has been utilized to rotate the propeller 27. It should be understood that the fan 28 creates a draft of air which may be used for ventilating the interior of the automobile and if desired may be safely directed against the face or body of an occupant, for none of the air and the customary dust and dirt accompanying that is taken from the engine fan 12 is discharged in the interior of the automobile. The draft from the engine fan 12 is merely used for the purpose of driving the fan 28.

The handle 29 is also provided with a hot air tubular member 32 which comprises a forked upper extremity. One branch 33 of the extremity of the hot air tubular member 32 is disposed upwardly into the front casing 26 of the discharge device and is adapted to discharge a current of heated air upon the fan 28 which distributes the same. The other extension 34 of the fork is disposed upwardly into the rear casing 21 and is adapted to discharge a draft of air onto the propeller 27 for rotating the same and the fan 28 connected therewith. It should be understood that the rotation of the fan 28 is merely for the purpose of distributing the heated air and for this reason it is desired that the rotation of the fan be slower than when the fan is used for cooling purposes. The amount of air applied on the propeller 27, when heated air is desired, is considerably less than the amount discharged on the propeller 27 when cold air is desired for in the first instance some of the heated air is discharged directly into the front casing 26. The receiving end of the hot air system is spaced apart from the engine fan 12 and this arrangement also results in a reduction of the speed of rotation of the fan 28 when the heated air system is employed. It should be understood that when the heated air system is employed the air distributed from the device is not usually discharged directly upon an occupant's face or body so that the small amount of dust and dirt discharged through the member 33 is immaterial.

A valve 35 is disposed at the base of the forked extremity of the hot air tube 32 and is provided with a handle by means of which the valve may be manipulated to close the passages in the tubular member 32 and in the extensions 33 and 34. A similar valve 36 is provided in the cold air tube 30. It should be understood that either or both of the valves 35 and 36 may be opened or closed at one time. It should further be understood that a hook 37 may be provided on the rear casing by means of which the discharge device 17 may be suitably suspended in any desired location.

Figure 6:
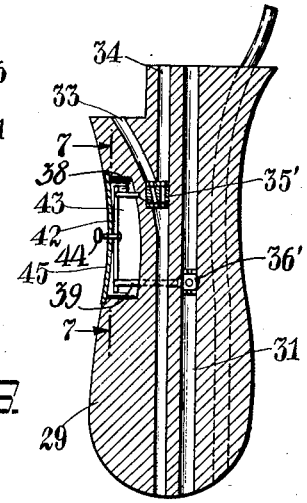
Fig. 6 is a sectional view of a further development of our invention.

In the modified form of our invention the construction and arrangement of elements together with the operation of the device is substantially the same as above, the difference being in the valve construction and manipulation. As shown in Fig. 6, a valve 36' is provided in the cold air tube 30, and a valve 35' is provided in the heated air tube 32. The valve 35' has apertures therein adapted to communicate with each of the branches 33 and 34 and is disposed in open position when the valve 36' of the cold air tube is in closed position. Valve rods 38 and 39 are attached to the valves 35' and 36', respectively, and each valve rod is provided at its extremity with substantially perpendicularly disposed extensions 40 and 41. A lever 42 is disposed in a recess 43 of the handle 29 and is pivotally attached to the ends of the extensions 40 and 41. This lever is provided with a handle 44 which extends through an arcuate slot in a plate 45 by manipulation of which the valves 36' and 35' may be rotated. It should be understood that when the valve 36' is in open position the valve 35' is in closed position and that when the handle 44 and lever 42 are manipulated to close the valve 36' the valve 35' is simultaneously opened providing the handle 44 is moved from one extreme position to the other extreme position of the arcuate slot in which it is guided. When the handle is disposed intermediate its extreme positions both valves are closed.

Having thus fully disclosed and described an embodiment of our invention what is desired to be secured by Letters Patent of the United States is:

1. A portable fan for motor vehicles adapted to discharge a cool draft of air into the interior of a vehicle and to discharge a heated current of air into the interior of said vehicle when desired.

2. The combination with a motor vehicle of an air receiving member mounted therein adjacent the cylinder block thereof, a conduit communicatively connected with said air receiving member, a discharge device communicatively connected with the other end of said conduit positioned in the interior of said motor vehicle, comprising a rear casing and a front casing, a shaft disposed through the front wall of said rear casing and extending into said front and rear casings, a propeller mounted on the rear end of said shaft, a fan on the front end thereof, and a tubular member mounted in said discharge device, comprising a forwardly disposed branch extending into said front casing for discharging heated air thereinto and a rearwardly disposed branch extending into said rear casing adapted to discharge a current of air on said propeller for rotating the same and the fan connected therewith to distribute the heated air discharged by said forwardly disposed branch.

3. The combination with a motor vehicle, of an air receiving member mounted thereon directly in back of the engine fan of said vehicle, a conduit communicatively connected with said air receiving member, a discharge device comprising a front and rear casing disposed in the interior of said motor vehicle, a shaft disposed through the front wall of said rear casing and journally mounted thereon, a propeller mounted on the rear end of said shaft and disposed in said rear casing, a fan mounted on the forward end of said shaft and disposed in said front casing, a handle attached to said front and rear casing having a passage therethrough, a tubular member disposed through said passage and communicatively connected at its lower end with said conduit, the upper end of said tubular member being positioned in said rear casing and adapted to discharge a draft of cool air against said propeller for rotating the same and the fan connected therewith, and a discharge conduit having a receiving end disposed in said rear casing and passing through said handle for carrying away the draft of air supplied to said rear casing and the dust mixed therewith.

4. A portable heating and cooling device comprising a handle, a front and rear casing mounted on said handle, a rotatively mounted shaft extending at one end into said front casing and at the other end into said rear casing, a propeller mounted on the rear end of said shaft, a fan mounted on the front end of said shaft, means for supplying a forced draft to said rear casing for rotating said propeller and the fan connected therewith comprising a conduit disposed through said handle and extending into said rear casing, and a discharge conduit mounted in said rear casing adapted to carry away the air and dirt mixed therewith.

5. A portable heating and cooling device for vehicles comprising a handle member, front and rear casings mounted on said handle member, a shaft rotatable mounted in said casings, a propeller mounted on said shaft and disposed in said rear casing, a fan mounted on said shaft and disposed in said front casing, hot and cold air conduits disposed through said handle into said rear casing adapted to discharge a blast of air onto said propeller for rotating the same and the fan connected therewith, and valve mechanism mounted in said handle for selectively shutting off the passage of air through one of said conduits.

In testimony whereof we have affixed our signatures.

IGNATIUS KOHN.
FRANK SAGHY.